Patented Mar. 24, 1925.

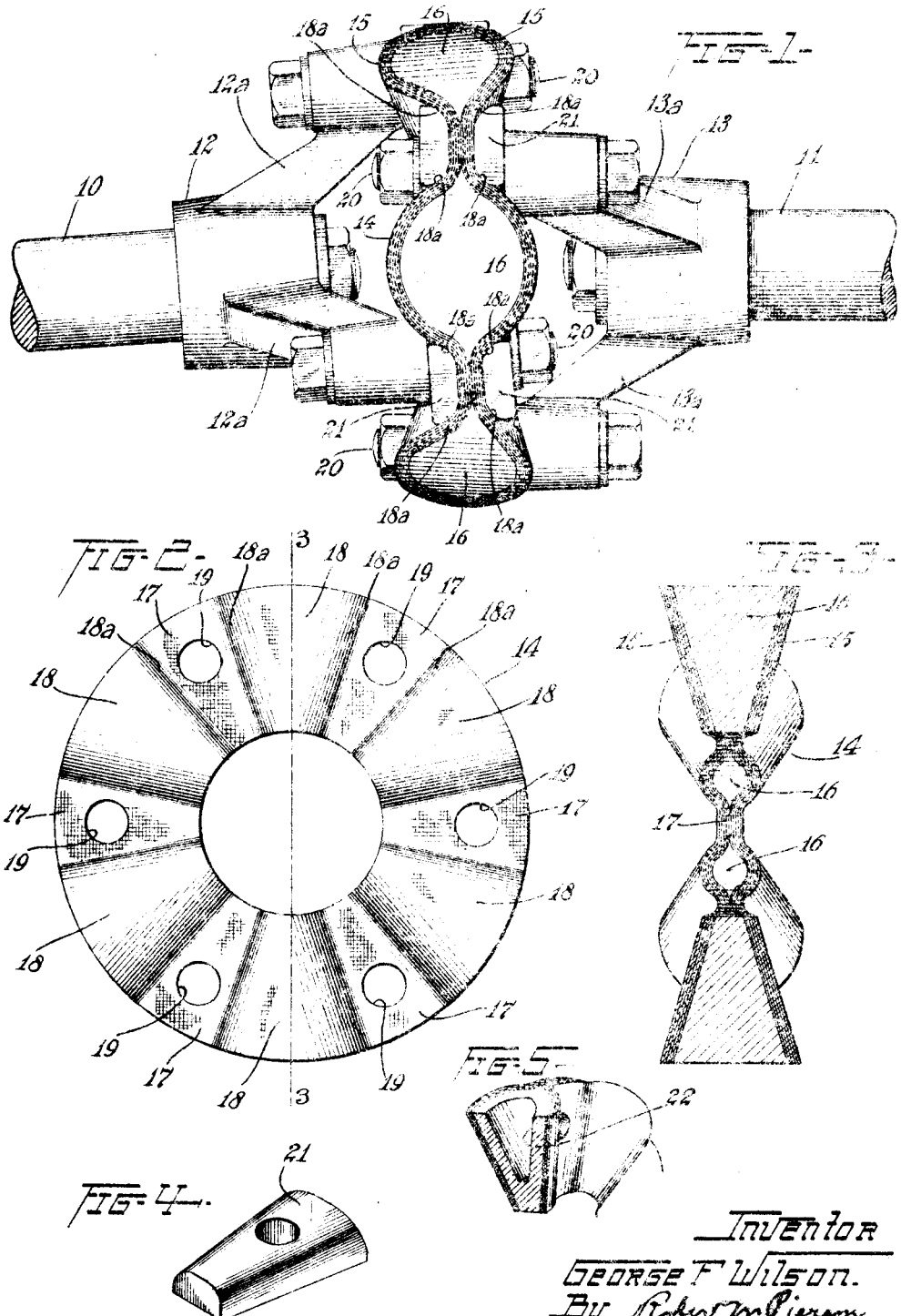

1,530,800

UNITED STATES PATENT OFFICE.

GEORGE F. WILSON, OF AKRON, OHIO, ASSIGNOR TO THE B. F. GOODRICH COMPANY, OF NEW YORK, N. Y., A CORPORATION OF NEW YORK.

FLEXIBLE COUPLING.

Application filed January 22, 1924. Serial No. 687,636.

*To all whom it may concern:*

Be it known that I, GEORGE F. WILSON, a citizen of the United States, residing at Akron, in the county of Summit and State of Ohio, have invented a certain new and useful Flexible Coupling, of which the following is a specification.

This invention relates to power transmission couplings and the like and more particularly to flexible or resilient elements therefor. A universal joint of the disk type, suitable for use in the power transmission system of an automobile, has been chosen for illustration in the accompanying drawings, but my invention is susceptible of different embodiments. Flexible coupling members of various kinds, usually in disk form, heretofore have been used in universal joints and the like, but where rubberized fabric disks have been used in such a joint the buckling of the compression segments of the disk and the repeated flexure of such segments has resulted in ply separation and unduly rapid deterioration. Where a plurality of parallel disks have been used between the spider arms, the buckling of the compression segments of the disks has frequently caused them to rub together, with the result of over-heating and destroying the material of the disk.

My general object is to provide an improved flexible or resilient element for connecting rigid members of a mechanism such, for example, as the spiders of a universal joint of the flexible disk type, and especially in combination with rigid anchorage members, an element adapted to be subjected to tension or to compression, or to both in alternation, or to be repeatedly flexed, for long periods of time without great deterioration. A more specific object is to provide an improved, flexible power-transmission joint in which resilient members are interposed operatively between the shafts, so as to cushion the action of the latter, and in which such resilient members will not rapidly deteriorate in use. Further objects are simplicity and economy of construction and improved cushioning and flexing qualities in a coupling element. Another more specific object is to provide a coupling element, comprising rubberized fabric, for example, which will be flexible and yet adapted to act by compression with substantial force and without rapid deterioration due to buckling and ply separation, or without excessive flexure under compression, such as has occurred in flexible coupling disks heretofore used.

Of the accompanying drawings:

Fig. 1 is a side elevation of a universal joint embodying my invention in a preferred form.

Fig. 2 is an elevation of a flexible coupling member constituting a part of the structure shown in Fig. 1.

Fig. 3 is a section on line 3—3 of Fig. 2.

Fig. 4 is a perspective view of one of a set of clamping members employed in the structure of Fig. 1.

Fig. 5 is a sectional perspective view of a flexible coupling member embodying my invention in a modified form.

Referring to the drawings, 10 and 11 are the adjacent end portions of a pair of shafts connected by a universal joint of the disk type, said joint comprising a pair of spiders 12, 13, secured to the ends of the respective shafts and having their arms $12^a$, $12^a$ and $13^a$, $13^a$ disposed in alternate relation, as is usual in universal joints of the disk type.

My improved, flexible coupling member, 14, in the form here shown comprises a pair of annular facing members or layers 15, 15, of laminated, rubberized fabric, and radially disposed, approximately frusto-conical cushion bodies of rubber 16, 16, spaced apart circumferentially of the coupling member and lying between the facing members 15, said bodies of rubber and the members 15 being laminations of rubberized fabric all being vulcanized together. Said facing members are joined together throughout radial clamp-receiving or attachment 17, 17, between the rubber bodies 16, the latter, with the rubberized fabric surrounding them, constituting relatively wide or thick and consequently non-buckling zones 18, 18, Fig. 2, alternating with the relatively thin attachment zones 17, the rubber body 16 being adapted by reason of its deformability to permit a bending of the coupling member just outside of the attachment zone.

The attachment zones 17 are formed with respective bolt holes 19, through which extend clamping bolts 20, 20, which secure the coupling member to the respective spider arms, each bolt being provided on each side of the coupling member with a radially disposed, preferably narrow, tapered clamp 21, formed with a rounded face to fit against the shoulders, 18ª, 18ª, of the adjacent thickened portions 18 and against the intervening clamping zone 17.

The operation of my improved coupling member will be best understood by first considering the fact that when, in the absence of torque, the shafts are angularly misaligned, segments in opposite quadrants of the coupling member are stretched and segments in the alternate or intervening quadrants are compressed. The construction of my coupling member is such as to permit this misalignment, by the stretchability and compressibility of the segments, without undue strain upon the fabric, the latter simply increasing or decreasing its bulged condition. When a substantial driving load is sutained by the joint, the stretchability of the coupling member as to certain segments permits other segments to be put under compression, or under increased compression, by the driving torque. The thickened portions 18 are adapted to act by such compression to transmit a very substantial portion of the driving torque, and this without excessive local flexure of the fabric facing members 15, the flexure of the latter being prevented from excessively localizing by the compelling action of the rubber cores 16 and the rounded clamps 21.

When the shafts are angularly misaligned, as shown in Fig. 1 and as they usually are in universal joints employed in automobiles, for example, t e coupling member 14 yields readily to permit such misalignment, which, as above stated, involves elongation of some segments and shortening of others, the rubber bodies or cores 16 being sufficiently deformable to permit a stretching or a compression of the segments between the spider arms without excessive elongation or straining or buckling of the fabric members, as the bulging form of the latter permits them to give by straightening or by bulging as well as by elongation or by compression, the rubber bodies between them acting as yielding struts.

The thickened portions 18 are next adja-cent the clamps as the angular relation of the spiders' axes is varied, the coupling member so wrapping about and maintaining a compression bearing against the convex shoulders 18ª of the clamps that the direct lines of compressive force between adjacent spider arms, in the compression segments, are sustained between the securely held, indented portions of the disc chiefly bearing, respectively, against one of the forward clamps at one spider arm and the rearward clamp at the other spider arm. Thus the segments are adapted to be deformed symmetrically with relation to such lines of force, when compressed by the driving torque, and do not buckle, the fabric facing members 15 adjacent the rubber bodies 16 simply bulging out slightly farther, on the two opposite sides of the coupling member, without excessive localization of flexure.

The thickened zones 18 are thus adapted to transmit torque by compression without such deformation as to result in rapid deterioration of the material. While the relatively thin attachment zones are securely held by the clamps, the adjacent portions of the zones 18 are sufficiently flexible or deformable to permit local flexure of the coupling member by their indentation against the convex clamps, and thus the flexure, as distinguished from simple tension and compression, is sufficiently localized adjacent the clamps 21 to permit the thickened portions 18 to accommodate themselves to the different positions of the spider arms without such flexure of their middle portions as to subject them to buckling when placed under compression between the spider arms. The attachment zones and the intervening thickened zones are preferably tapered toward a common center, as shown, so that as the angular relation of the spiders is varied the relation of the tapered clamps to the shoulders 18ª of the thickened zones will continue to be substantially the same throughout the length of said clamps, but my invention is not wholly limited to this feature.

In the modification shown in Fig. 5, the specific form of which I do not claim as my invention, the rubber core member is hollowed out as shown at 22, to increase its deformability which permits the stretching of alternate segments necessary to putting the intervening segments under compression, while retaining the advantage of preventing buckling and excessive localization of flexure, and also to ventilate and prevent overheating of the thickened segments.

Further modifications may be resorted to within the scope of my invention, and I do not wholly limit my claims to the specific embodiments shown

I claim:

1. In combination with a power driven mechanism, a coupling comprising a pair of rigid anchorage members and a coupling member connecting the two, said coupling member comprising a relatively thin portion, attached to one of said anchorage members and adapted by flexure to permit variation of the angular relation of the latter, and a relatively thick portion between said anchorage members, united with said thin portion and adapted to act by compression to transmit force from one to the other of said anchorage members without buckling, although the angular relation of said anchorage members be varied as permitted by said thin portion.

2. In combination with a power driven mechanism, a coupling comprising a pair of rigid anchorage members and a coupling member connecting the two, said coupling member comprising a relatively thick, resilient body between said anchorage members and adapted to transmit force by compression between the two, and flexible means hinging said body to said anchorage members.

3. A coupling comprising a pair of rigid anchorage members and a coupling member connecting the two, said coupling member comprising a relatively thick, non-buckling body between said anchorage members and adapted to transmit force by compression between the two, and flexible means hinging said body to said anchorage members, said body and said flexible means together comprising a structure of rubber and fibrous material bulging in double convex form to provide said body and narrowing adjacent said anchorage members to provide said flexible means.

4. A coupling comprising a pair of rigid anchorage members and a coupling member connecting the two, said coupling member comprising a surfacing of flexible material converging into zones of small cross-section at spaced apart positions, to provide relatively thin attachment portions, and a relatively thick core embraced by said surfacing between said attachment portions to provide a body portion adapted to contact said anchorage members to transmit force by compression, the relative thicknesses of said body portion and said attachment portions being such as to localize flexure of said coupling member adjacent said attachment portions.

5. A coupling comprising a pair of rigid anchorage members and a coupling member connecting the two, said coupling member comprising two opposite surface layers of rubberized fabric clamped to said anchorage members and closely approaching each other thereat, and a body of rubber between said anchorage members and embraced by and vulcanized to said layers of fabric, said coupling member being of such small cross-section at said anchorage members as to localize its flexure thereat as the angular relation of said anchorage members is varied, and of such large cross-section throughout the rest of the span between said anchorage members as to act by compression and without buckling to transmit force between said members notwithstanding variations in the angular relation of the latter.

6. A coupling comprising a pair of rigid anchorage members, a coupling member connecting the two, said coupling member comprising a thick, double-convex, medial portion adapted to act by compression to transmit force between said anchorage members, and relatively thin attachment portions secured to said anchorage members, said medial portion being resilient under compression, and means on said anchorage members, fitting against the junctions of the attachment portions with said medial portion, for transmitting compressive forces to or receiving such forces from said medial portion.

7. A power transmission coupling member comprising a circumferential series of relatively thin, radially disposed attachment zones and relatively thick, inwardly tapered, radially disposed, elastic zones alternating with said attachment zones, the construction being such as to localize flexure adjacent said attachment zones as said member is distorted.

8. A coupling disk comprising a circumferential series of inwardly tapered, radially disposed, conoidal rubber cushions, and facings of rubberized fabric embracing and vulcanized to said cushions, said cushions providing relatively thick zones alternating with relatively thin, radially disposed, clamp-receiving zones.

9. A power transmission coupling comprising a pair of juxtaposed, approximately coaxial rotary members, resilient, torque-transmitting means interposed operatively between the two, said means comprising a circumferential series of radially disposed, inwardly tapered, conoidal cushions comprising rubber, relatively thin, radially disposed attachment zones integral with said cushions at opposite sides of each, and a series of pairs of radially disposed, inwardly tapered clamps embracing the attachment zones to secure the said torque-transmitting means to said rotary members, and adapted to abut said cushions to transmit compressive forces thereto.

10. A power-transmission coupling member comprising a structure of rubber and fibrous material bulging in double-convex form at circumferentially spaced-apart portions and narrowing to provide relatively thin portions between the bulged portions.

11. A power-transmission coupling comprising a pair of spiders disposed with their arms in alternate relation and a coupling member interposed operatively between and attached to the several arms of said spiders, said coupling member comprising a surfacing of fibrous material converging into zones of small cross-section at said spider arms, to provide relatively thin attachment portions, and relatively thick cores embraced by said surfacing between said attachment portions to provide non-bukling compression elements for torque transmission.

12. A power-transmission coupling member comprising a surfacing of fibrous material converging into zones of small cross-section at a series of circumferentially spaced-apart positions and cores embraced by said surfacing between said zones of small cross-section to provide relatively thick and non-buckling zones.

13. A power-transmission coupling comprising a pair of spiders disposed with their arms in alternate relation and a coupling member interposed operatively between and attached to the several arms of said spiders, said coupling member comprising two opposite surface layers of rubberized fabric clamped to said spider arms and closely approaching each other thereat, and bodies of rubber embraced by and vulcanized to said fabric layers in spaces between adjacent spider arms, said coupling members being of such small cross-section at said spider arms as to localize its flexure thereat as the angular relation of said spiders' axes is varied, and of such large cross-section throughout the rest of the spaces between adjacent spider arms as to act by compression and without buckling to transmit force between said spider arms notwithstanding variations in the angular relation of the latters' axes.

14. A power-transmission coupling comprising two opposite surface layers of rubberized fabric closely approaching each other at circumferentially spaced-apart positions to provide narrow clamping zones, radially disposed, inwardly tapered bodies of rubber embraced by and vulcanized to said fabric layers between said narrow zones, and pairs of radially disposed, inwardly tapered clamps embracing said attachment zones and formed with convex shoulders opposed to the fabric overlying said bodies of rubber.

15. A power-transmission coupling comprising a pair of spiders disposed with their arms in alternate relation and a coupling member interposed operatively between and attached to the several arms of said spiders, said coupling member comprising thick, double-convex portions between adjacent spider arms, adapted to act by compression to transmit force between said spider arms, and relatively thin and flexible means hinging said thick portions to said spider arms, said thick portions being resilient under compression, and means on said spider arms, fitting against the junction of the hinging means with the thick portions, for transmitting compressive forces to or receiving such forces from said thick portions.

16. A power-transmission coupling comprising a pair of spiders disposed with their arms in alternate relation and a coupling member interposed operatively between and attached to the several arms of said spiders, said coupling member comprising a circumferentially spaced series of thin, fan-shaped attachment zones, the converging side lines of all of said zones being radial with relation to a common center, bulging, double-convex, radially tapered zones between said attachment zones, presenting shoulders extending along the converging side lines of the latter, and radially tapered abutment means on said spider arms fitting against said shoulders.

17. A power-transmission coupling member comprising a circumferentially spaced-apart series of thick, cushion portions comprising rubber, and thin attachment portions connecting said cushion portions, said member being adapted for localization of flexure adjacent said attachment portions as the said member is distorted.

18. A power-transmssion coupling member comprising a circumferentially spaced-apart series of thick cushion portions composed chiefly of rubber, and attachment portions connecting said cushion portions and reinforced with fibrous material at their junctions with said cushion portions, the said member being adapted for localization of flexure at said junctions as the said member is distorted.

In witness whereof I have hereunto set my hand this 18th day of January, 1924.

GEORGE F. WILSON.